(12) United States Patent
Uehara

(10) Patent No.: US 8,135,873 B2
(45) Date of Patent: Mar. 13, 2012

(54) INFORMATION PROCESSING DEVICE FOR PERFORMING INFORMATION EXCHANGE BETWEEN A PCI EXPRESS BUS AND A NON-PCI EXPRESS BUS INTERFACE

(75) Inventor: Teruaki Uehara, Kanagawa (JP)

(73) Assignee: Oki Semiconductor Co., Ltd. (JP)

( * ) Notice: Subject to any disclaimer, the term of this patent is extended or adjusted under 35 U.S.C. 154(b) by 0 days.

(21) Appl. No.: 12/832,581

(22) Filed: Jul. 8, 2010

(65) Prior Publication Data
US 2011/0029696 A1 Feb. 3, 2011

(30) Foreign Application Priority Data
Jul. 28, 2009 (JP) ................................ 2009-175706

(51) Int. Cl.
*G06F 3/00* (2006.01)
(52) U.S. Cl. .......................................... 710/9; 711/200
(58) Field of Classification Search .................. None
See application file for complete search history.

(56) References Cited

U.S. PATENT DOCUMENTS

| 6,799,261 | B2* | 9/2004 | May et al. .................. 711/220 |
| 7,752,360 | B2* | 7/2010 | Galles ........................ 710/62 |
| 2003/0018879 | A1* | 1/2003 | Sahraoui et al. .............. 712/1 |
| 2003/0093604 | A1* | 5/2003 | Lee .......................... 710/302 |
| 2003/0172244 | A1* | 9/2003 | Nagaoka .................... 711/202 |
| 2004/0019709 | A1* | 1/2004 | Bissessur et al. ............ 710/14 |

FOREIGN PATENT DOCUMENTS

| JP | 2009-010920 A | 1/2009 |
| JP | 2009-070249 A | 4/2009 |

* cited by examiner

*Primary Examiner* — Elias Mamo
(74) *Attorney, Agent, or Firm* — Studebaker & Brackett PC; Donald R. Studebaker

(57) ABSTRACT

An information processing device includes: an address converter including a base address register in which address conversion information is stored and a conversion circuit that converts a PCI Express standard bus address of an inputted packet to a non-PCI Express standard bus address; and a packet generator. When first configuration information of a first device that has a device-unique unique address, is connected to a non-PCI Express standard bus and is unaware of the unique address is stored, the packet generator generates an address setting-use configuration write request packet, and when second configuration information including change information for changing the base address register to a base address register of a second device where at least one of an address width and an internal memory address is a device-unique unique value, the packet generator generates a change setting-use configuration write request packet and outputs the generated packet to the address converter.

6 Claims, 15 Drawing Sheets

FIG.3

| Address | 7 | 6 | 5 | 4 | 3 | 2 | 1 | 0 | 15 | 14 | 13 | 12 | 11 | 10 | 9 | 8 |
|---|---|---|---|---|---|---|---|---|---|---|---|---|---|---|---|---|
| 0 | AE (10) | | 1st DW BE | | | AHB_adr[11:10] | | AHB_adr[19:12] | | | | | | | |
| 2 | Device No. | | | | | Func No. | | AHB_adr[9:2] | | | | | | | |
| 4 | Data[31:24] | | | | | | | Data[23:16] | | | | | | | |
| 8 | Data[15:8] | | | | | | | Data[7:0] | | | | | | | |

FIG.4

| Address | 7 | 6 | 5 | 4 | 3 | 2 | 1 | 0 | 15 | 14 | 13 | 12 | 11 | 10 | 9 | 8 |
|---|---|---|---|---|---|---|---|---|---|---|---|---|---|---|---|---|
| 0 | AE (0 1) | | 1st DW BE | | | | Reserve | | Tag | | | | | | | |
| 2 | Device No. | | | | | | Func No. | | Res | | | | Register No. | | | |
| 4 | Data[31:24] | | | | | | | | Data[23:16] | | | | | | | |
| 8 | Data[15:8] | | | | | | | | Data[7:0] | | | | | | | |

FIG.6

| | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| | R | 1 | 0 | 0 | 1 | 0 | 0 | 0 | R | | TC | | | R | | | TD | EP | Attr | | | R | | | Length | | | | | | | |
| | Requester ID | | | | | | | | | | | | | | | | Tag | | | | | | | | Last DW BE | | | | 1st DW BE | | | |
| | Bus No. | | | | | | | | Device No. | | | | | Func No. | | | AE (01) | | R | | Ext Reg No. | | | | Register No. | | | | R | | | |
| | Data | | | | | | | | | | | | | | | | | | | | | | | | | | | | | | | |

FIG.9

| | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| | R | 1 | 0 | 0 | 0 | 1 | 0 | 0 | R | \multicolumn{3}{c}{TC} | | | R | | TD | EP | \multicolumn{2}{c}{Attr} | | R | \multicolumn{10}{c}{Length} | | | | | | | | | |
| | \multicolumn{8}{c}{Requester ID} | | | | | | | | | \multicolumn{8}{c}{Tag} | | | | | | | | \multicolumn{4}{c}{Last DW BE} | | | | \multicolumn{4}{c}{1st DW BE} | | | | |
| | \multicolumn{8}{c}{Bus No.} | | | | | | | | | \multicolumn{5}{c}{Device No.} | | | | | \multicolumn{3}{c}{Func No.} | | | R | | | | | \multicolumn{4}{c}{Ext Reg No.} | | | | \multicolumn{6}{c}{Register No.} | | | | | | R |
| | \multicolumn{32}{c}{Data} | | | | | | | | | | | | | | | | | | | | | | | | | | | | | |

INFORMATION PROCESSING DEVICE FOR PERFORMING INFORMATION EXCHANGE BETWEEN A PCI EXPRESS BUS AND A NON-PCI EXPRESS BUS INTERFACE

CROSS-REFERENCE TO RELATED APPLICATION

This application claims priority under 35 USC 119 from Japanese Patent Application No. 2009-175706 filed on Jul. 28, 2009, the disclosure of which is incorporated by reference herein.

BACKGROUND OF THE INVENTION

1. Field of the Invention

The present invention relates to an information processing device for performing information exchange by a PCI Express bus and a non-PCI Express bus interface.

2. Description of the Related Art

In recent years, an I/O serial interface called PCI Express has been used in personal computers (PCs) and associated peripherals.

PCI Express (hereinafter abbreviated as "PCIe") realizes a 2-Gbps transfer speed by using 1 lane and realizes a 64-Gbps transfer speed by using 32 lanes.

In PCIe, there are prescribed layer structures resulting from the three layers of a physical layer, a data link layer and a transaction layer (see FIG. 2) and the two layers of a software layer and a configuration/OS layer. PCIe is capable of changing, with software, the address map of a device that has a configuration register and is connected to a PCIe standard bus (hereinafter called a "PCIe bus"). The configuration/OS layer realizes PCI plug and play, and when a device is connected to a bus, settings and software installation necessary in order for the PC to automatically cause the device to operate are performed without the support of the user.

Because of these mechanisms, even when an address to which a device is connected differs, the same driver software can be used by using one driver per device. Conventionally, in a device connected to a bus (a non-PCIe bus), it has been necessary to perform driver development separately per hardware component when an address differs even with the same device. In PCIe, there is no longer the need to perform that driver development. That is, by using a device connected to a PCIe bus, device driver software does not have to be separately developed.

There is the desire to want to use conventional bus (non-PCIe bus)-connected devices of which creation and verification have been completed and which also have a performance record.

For that reason, there are technologies that use a device connected to a conventional bus as a device connected to a PCIe bus. For example, there are technologies that use a device connected to a PCI bus as a device connected to a PCIe bus (e.g., see Japanese Patent Application Laid-Open (JP-A) No. 2009-10920 and JP-A No. 2009-70249).

A device connected to another bus such as an AHB standard bus widely used for integration purposes has an address map that is fixed to its hardware and is incapable of being changed by software. For that reason, there are technologies that use an address conversion circuit (see FIG. 15) disposed in a PCIe configuration space to convert between a PCIe standard bus address (hereinafter called a "PCIe address") and a non-PCIe standard bus address.

FIG. 15 is a configuration diagram showing the general configuration of one example of an address converter 118 equipped with a PCIe-AHB address conversion circuit 134 that performs conversion between a PCIe address and an AHB standard bus address (hereinafter called an "AHB address").

In a base address register (hereinafter abbreviated as "BAR") 132 disposed in the configuration space, a PCIe beginning address, a PCIe address width and an AHB offset address that correspond to a device connected to an AHB bus are stored beforehand.

The PCIe-AHB address conversion circuit 134 converts between a PCI address and an AHB address on the basis of information stored in the BAR 132. As one example, a case where the PCIe-AHB address conversion circuit 134 converts a PCIe address into an AHB address will be described. When an inputted PCIe address satisfies expression (1) and expression (2), the PCIe-AHB address conversion circuit 134 converts the inputted PCIe address into an AHB address by calculating an AHB address by expression (3).

$$\text{PCIe address} \geq \text{PCIe beginning address} \quad (1)$$

$$\text{PCIe address} \leq (\text{PCIe beginning address} + \text{PCIe address width}) \quad (2)$$

$$\text{AHB address} = \text{PCIe address} - \text{PCIe beginning address} + \text{AHB offset address} \quad (3)$$

In FIG. 15, there are cases where an information processing device 10 using the PCIe-AHB address conversion circuit 134 has to perform setting depending on the device.

For example, in a case where PCIe is used, initialization of a device connected to a PCIe bus is implemented before a CPU controlling PCIe operates. Usually, initialization of the device is performed as a result of the CPU resetting the device when power is switched ON. However, there are cases where initialization of the device cannot be performed by resetting the device. For example, in a case where the device is a network-use device, the device has a unique media access control (MAC) address and is identified by this MAC address. Consequently, it is necessary to set the MAC address in the device before the CPU operates.

Further, for example, in a case where the device is a field programmable gate array (FPGA), the PCIe address width and the AHB offset address that the device uses are dependent on the circuit of that device. Consequently, it is necessary to perform setting to change the PCIe address width and the AHB offset address stored in the BAR 132 to values corresponding to that device.

SUMMARY OF THE INVENTION

The present invention has been made in view of the above circumstances and provides an information processing device.

According to an aspect of the invention, there is provided an information processing device including: an address converter including a base address register in which is stored address conversion information including information relating to an address width of a bus that transmits and receives data and an internal memory address of a device, and a conversion circuit that converts, on the basis of the address conversion information stored in the base address register, a PCI Express standard bus address of an inputted packet into a non-PCI Express standard bus address; and a packet generator, wherein when first configuration information, which is based on the PCI Express standard and which includes a device-unique unique address of a first device that is connected to a non-PCI Express standard bus and that has the unique address and that is unaware of the unique address, is stored previously in a storage, the packet generator generates, on the basis of the first configuration information stored in the storage, an address setting configuration write request packet including the unique address that causes the first device to become aware of the unique address, and outputs the address setting configuration write request packet to the address converter, and when second configuration information which is based on the PCI Express standard and which includes change information for changing the base address register to a base address register in which is stored a device-unique unique value of a second device that is connected to a non-PCI Express standard bus, the unique value being at least one of an address width or an internal memory address, is stored previously in the storage, the packet generator generates, on the basis of the second configuration information stored in the storage, a change setting configuration write request packet including the change information, and outputs the change setting configuration write request packet to the address converter.

BRIEF DESCRIPTION OF THE DRAWINGS

Preferred embodiments of the present invention will be described in detail based on the following figures, wherein:

FIG. 3 is an explanatory diagram for describing one specific example of initial setting information with respect to a device that initially sets an identification address pertaining to the first embodiment;

FIG. 4 is an explanatory diagram for describing one specific example of initial setting information with respect to a device that initially sets a PCIe address width and an AHB offset address pertaining to the first embodiment;

FIG. 6 is an explanatory diagram for describing one specific example of a header of a change setting packet pertaining to the first embodiment;

FIG. 9 is an explanatory diagram for describing one specific example of a header of a common configuration write request packet;

DETAILED DESCRIPTION OF THE INVENTION

Embodiments of the present invention will be described in detail below with reference to the drawings.

Figure 1:
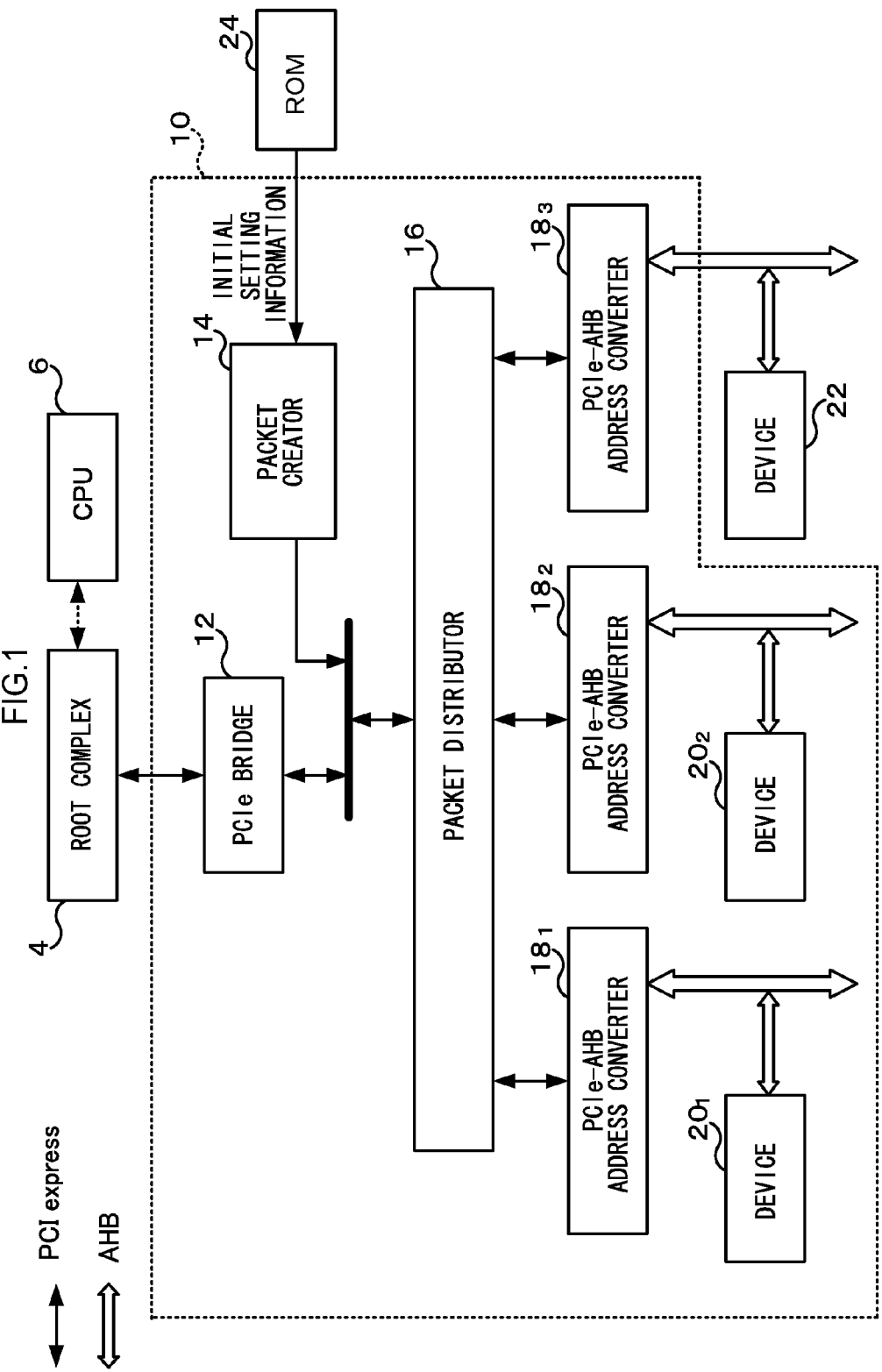
FIG. 1 is a general configuration diagram of one example of an information processing device pertaining to a first embodiment.

FIG. 1 shows one example of the general configuration of an information processing device 10 of a first embodiment. The information processing device 10 of the present embodiment is, as one example, formed on one chip (not shown).

In the present embodiment, there will be described a case where the information processing device 10 is, as one specific example, an information processing device for using devices $20_1$ and $20_2$ connected to an AHB bus and a device 22 as devices connected to a PCIe bus. As one specific example, it will be assumed that the devices $20_1$ and $20_2$ are devices that have unique identification addresses such as MAC addresses, for example, and that the devices $20_1$ and $20_2$ are devices that are unaware of those unique identification addresses. As one specific example, it will be assumed that the device 22 is a programmable device such as a FPGA and is a device having a unique address width and an offset address (an address dependent on an internal memory address).

The information processing device 10 of the present embodiment is configured to include a PCIe bridge 12, a packet creator 14, a packet distributor 16, PCIe-AHB address converters $18_1$ to $18_3$, and the devices $20_1$ and $20_2$.

The PCIe bridge 12 performs protocol conversion in order to make it possible for a device connected to an AHB bus to be connected to a PCIe base system. The PCIe bridge 12 is connected by a PCIe bus to a root complex 4.

The root complex 4 is a host bridge device for interconnecting a local bus of a CPU 6 and the PCIe bridge 12. The root complex 4 has the function of executing communications with the devices $20_1$ and $20_2$ and the device 22 via the PCIe bridge 12. When there is another device (endpoint) connected to a PCIe bus, the root complex 4 interconnects a local device of the CPU 6 and that device.

The CPU 6 is a processor that controls the operation of a PC (not shown) in which the information processing device 10 is built and executes various types of programs such as an operating system and application programs stored in a storage such as a memory that is not shown.

Figure 2:
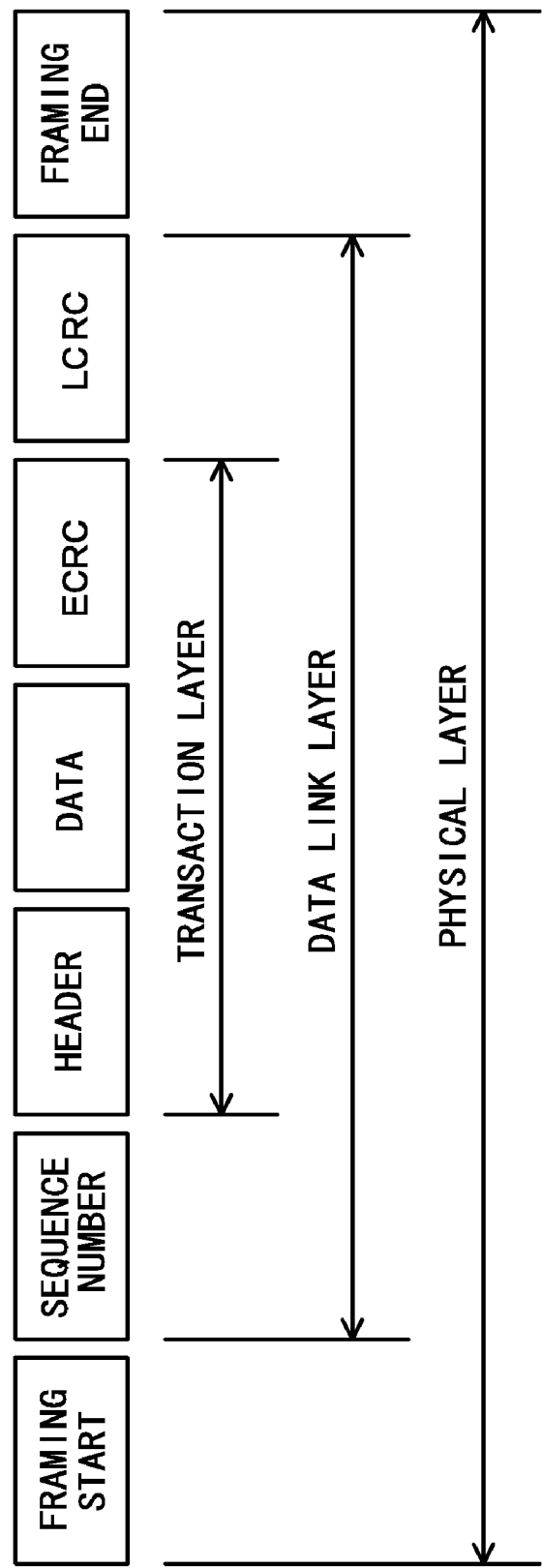
FIG. 2 is an explanatory diagram for describing a PCIe layer structure.

The packet creator 14 creates, on the basis of initial setting information (configuration information) stored in a ROM 24, either an initialization setting packet for initializing a device by causing the device to become aware of its identification address or a change setting packet for changing the setting of a base address register (described in detail later) included in the PCIe-AHB address converters $18_1$ to $18_3$. Usually, the PCIe protocol has a layer structure of 3 layers of a physical layer, a data link layer and a transaction layer shown in FIG. 2. The transaction layer receives a request (read/write request) issued from the CPU 6 or a device, creates a transaction layer packet (hereinafter abbreviated as "TLP") including a header, data and an ECRC, and transfers the TLP to the data link layer. The data link layer has the function of maintaining data integrity in order to reliably perform packet transmission via a PCIe link, adds a sequence number and an LCRC to the TLP received from the transaction layer to create a data link layer packet (hereinafter abbreviated as "DLLP"), and transfers the DLLP to the physical layer. The sequence number is for checking whether or not all packets have arrived, and the LCRC is for checking, in the data link layer on the packet receiving side, whether or not the content of a packet has changed. The physical layer has the function of adding framing symbols to the beginning and the end of the DLLP received from the data link layer and transferring the packet as serial data.

The transaction layer supports a memory space, an I/O space, a configuration space and a message space. With this, there are the following four TLP packets: a memory (read/write) request packet that transmits and receives stream data (signals) such as control signals and video data of a counterpart device and requests reading/writing with respect to a memory; an I/O (read/write) request packet that mainly receives control signals of a counterpart device and requests reading/writing with respect to an I/O; a configuration (read/write) request packet that transmits and receives PCIe-compliant control information and requests reading/writing with respect to the configuration space; and a message packet for transmitting and receiving interrupt error information and management information such as power controls.

The packet creator 14 creates, on the basis of the initial setting information stored in the ROM 24, either the initialization setting packet or the change setting packet which have the same form as a configuration write request packet. The initialization setting packet corresponds to an address setting-use configuration write request packet, and the change setting packet corresponds to a change setting-use configuration write request packet.

The ROM 24 is disposed outside the information processing device 10, and initial setting information corresponding to each of the devices 20$_1$ and 20$_2$ and the device 22 is stored beforehand in the ROM 24. With respect to the devices 20$_1$ and 20$_2$, initial setting information including AHB addresses corresponding to the identification addresses of the devices 20$_1$ and 20$_2$ and information (AE=10) indicating the inclusion of the AHB addresses is stored beforehand by the user of the devices 20$_1$ and 20$_2$. FIG. 3 shows one specific examples of initial setting information for initially setting an AHB address (identification address) in a device in this manner. AE corresponds to generated packet class information. The initial setting information of the present embodiment shown in FIG. 3 is 64-bit data where "AE" (2 bits), which indicates whether the initial setting information is information for generating the initialization setting packet (or the initialization setting packet itself) or information for generating the change setting packet (or the change setting packet itself), and "AHB_adr" (18 bits), which indicates an AHB address, have been added to information (configuration information) for generating a common configuration write request packet. In the present embodiment, when AE=10, this indicates the initialization setting packet, and when AE=01, this indicates the change setting packet, and when AE=00 or 11, this indicates a normal (neither the initialization setting packet nor the change setting packet) packet.

In the ROM 24, with respect to the device 22, initial setting information including a register number of a BAR (a BAR 33, see FIG. 7) in which a PCIe address width and an AHB offset address unique to the device 22 are stored and information (AE=01) indicating the inclusion of the register number of the BAR 33 are stored beforehand by the user who has programmed the device 22. FIG. 4 shows one specific example of initial setting information for setting the PCIe address width and the AHB offset address used in address conversion to unique values of the device 22 in this manner. The initial setting information of the present embodiment shown in FIG. 4 is 64-bit data where "AE" (2 bits), which indicates whether the initial setting information is information for generating the initialization setting packet (or the initialization setting packet itself) or information for generating the change setting packet (or the change setting packet itself), and the register number "Register No." (6 bits) of the BAR 33 have been added to information (configuration information) for generating a common configuration write request packet.

Initial setting information of AE=00 or AE=11 is stored in the ROM 24 in the case of a normal device (a device that does not have a device-unique identification address or a device where the PCIe address width and the AHB offset address are not unique values (are prescribed values)) other than the devices 20$_1$ and 20$_2$ and the device 22, or in the case of a device that is not used, or in the case of denoting the end of initial setting of a device.

Figure 5:
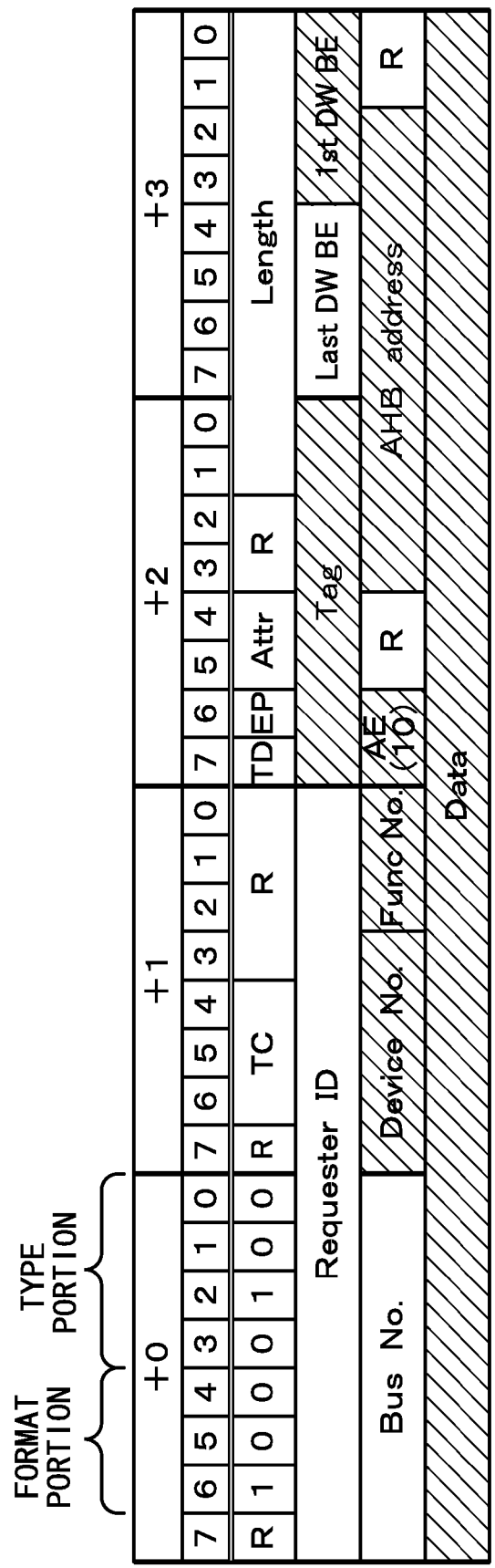
FIG. 5 is an explanatory diagram for describing one specific example of a header of an initialization setting packet pertaining to the first embodiment.

The packet creator 14 transforms the header of a configuration write request packet on the basis of the information stored in the ROM 24, creates the initialization setting packet based on the PCIe standard shown in FIG. 5 when the initial setting information stored in the ROM 24 is information for generating the initialization setting packet shown in FIG. 3, and creates the change setting packet based on the PCIe standard shown in FIG. 6 when the initial setting information stored in the ROM 24 is information for creating the change setting packet shown in FIG. 4. Format portions and type portions (both described in detail later) of the initialization setting packet and the change setting packet are the same as the format portion and the type portion of a configuration write request packet.

The packet creator 14 has the function of switching the packet input destination inputted to the packet distributor 16. When the initial setting information inputted from the ROM 24 is AE=00 or AE=11, the packet creator 14 switches the input destination such that the packet is inputted from the PCIe bridge 12 to the packet distributor 16.

The packet distributor 16 outputs an inputted packet to the corresponding PCIe-AHB address converters 18$_1$ to 18$_3$ on the basis of the bus number (Bus No.), device number (Device No.) and function number (Function No.) of the inputted packet.

The PCIe-AHB address converters 18$_1$ to 18$_3$ converts between the PCIe address and the AHB address of the inputted packet. When it is not necessary to distinguish between the PCIe-AHB address converters 18$_1$ to 18$_3$, they will be collectively called the PCIe-AHB address converters 18, and when distinguishing between each, the numbers 1 to 3 indicating each will be added.

Figure 7:
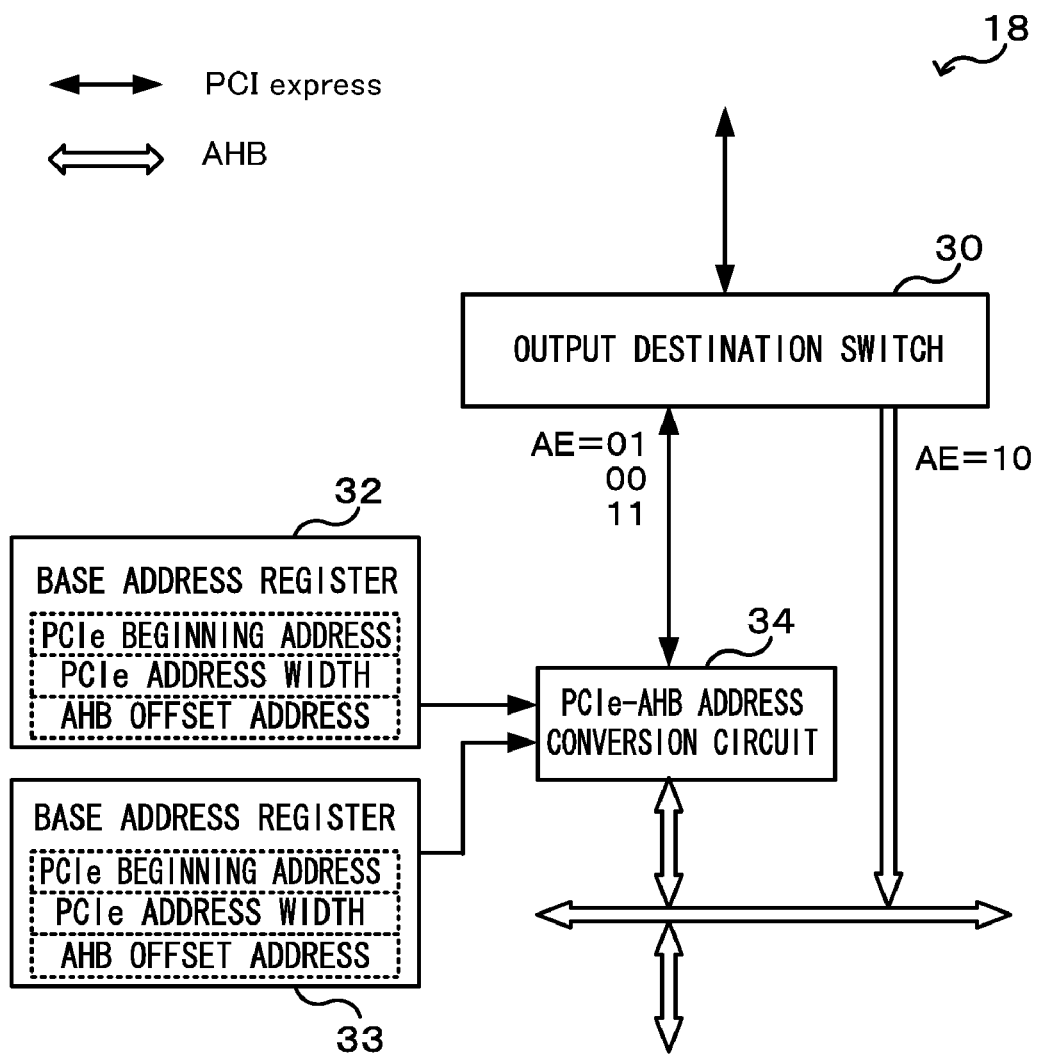
FIG. 7 is a general configuration diagram of one example of a PCIe-AHB address converter pertaining to the first embodiment.

FIG. 7 shows one example of the general configuration of the PCIe-AHB address converters 18. The PCIe-AHB address converters 18 of the present embodiment are configured to include an output destination switch 30, a BAR 32, a BAR 33 and a PCIe-AHB address conversion circuit 34.

When the inputted packet is AE=01, 00, or 11, the output destination switch 30 outputs that packet to the PCIe-AHB address conversion circuit 34. When the inputted packet is AE=10, the output destination switch 30 outputs that packet to the device 20$_1$ or 20$_2$ on the basis of the AHB address that the packet shows without involving the PCIe-AHB address conversion circuit 34.

In the BAR 32, a PCIe beginning address of a prescribed value, a PCIe address width and an AHB offset address are stored beforehand. In the present embodiment, in the BAR 33, a PCIe beginning address of a prescribed value is stored beforehand, and a PCIe address width and an AHB offset address unique to the device 22 are stored beforehand by the user of the device 22.

The PCIe-AHB address conversion circuit 34 converts the PCIe address and the AHB address of the inputted packet by "AHB address=PCIe address−PCIe beginning address+AHB offset address" (expression (3)) on the basis of the PCIe beginning address, the PCIe address width and the AHB offset address stored in the BAR 32 or the BAR 33.

Figure 8:
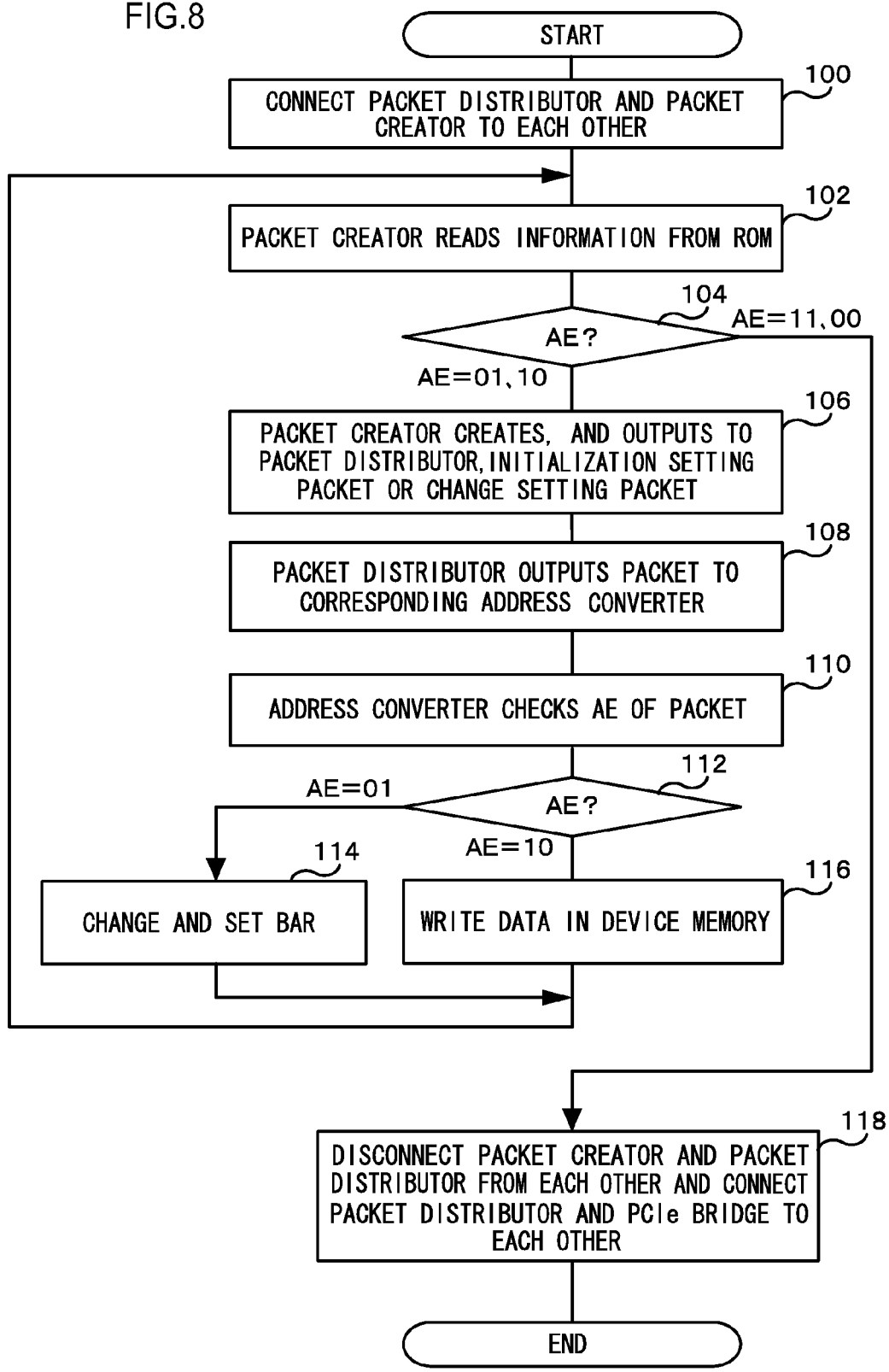
FIG. 8 is a flowchart for describing one example of a flow of initial setting processing pertaining to the first embodiment.

Next, the operation of each component will be described in detail in accordance with a flow of setting processing. FIG. 8 shows a flowchart of one example of setting processing of the present embodiment. This setting processing is executed after the CPU 6 has reset the devices $20_1$ and $20_2$ and the device 22 when power is switched ON.

In step 100, the packet creator 14 and the packet distributor 16 are connected to each other to ensure that the packet that has been created by the packet creator 14 is inputted to the packet distributor 16.

In step 102, the packet creator 14 reads the initial setting information from the ROM 24, and in the next step 104, the packet creator 14 searches for AE (the portion corresponding to AE) of the initial setting information it has read. When AE=00 or AE=11, it is judged that there is no initial setting information in the ROM 24, and the flow proceeds to step 118 without performing setting processing corresponding to the device. When AE=01 or AE=10, the flow proceeds to step 106.

In step 106, the packet creator 14 creates the initialization setting packet or the change setting packet depending on the value of AE it searched for in step 104 and outputs the created packet to the packet distributor 16.

When AE=01, the inputted initial setting information is the information shown in FIG. 4, so the packet creator 14 creates the change setting packet in which the header portion of a normal configuration write request packet has been transformed. FIG. 9 shows a normal configuration write request packet. The header of the configuration write request packet is configured by 12 bytes (6 bits) and includes a Format portion, a Type portion, R, TC, TD, EP, Attr, Length, Requester ID, Tag, Last DW BE, 1st DW BE, Bus No., Device No., Function (Func) No., Ext Reg No. and Register No.

The Format portion and the Type portion denote the type of layout of the TLP and specifically whether the TLP is a memory (read/write) request packet, an I/O (read/write) request packet, a configuration (read/write) request packet, or a message packet. TC denotes traffic class/VC support. TD and EP denote end-to-end data maintainability. Attr denotes attribute: snoop, ordering. Length denotes the number of addresses on which data writing and reading will be performed from the start address. Requester ID denotes the request such as write or read with respect to the device. Tag denotes transaction tag. Last DW BE denotes last DW BE, and 1st DW BE denotes first DW BE. Bus No. denotes bus number. Device No. denotes device number (in the present embodiment, the number of the PCIe-AHB address converter 18). Func No. denotes function number. Ext Reg No. denotes extension register number. Register No. denotes the number of a register converted to an address by the PCIe-AHB address converter 18. R (reserved) is a portion reserved for future extension. Data shown in FIG. 9 represents a data field after the header.

The packet creator 14 creates the change setting packet shown in FIG. 6 in a state where the R portion of the normal configuration write request packet shown in FIG. 9 has been transformed. In the change setting packet shown in FIG. 6, specifically, bits 7 and 6 of byte +2 in row 3 of the normal configuration write request packet are replaced by AE=01, and bits 2 to 7 of byte +3 in row 3 are replaced by Register No. Register No. denotes the register in which the PCIe address width and the AHB offset address of the device-unique values are stored.

In the same manner, when AE=10, the inputted initial setting information is the information shown in FIG. 3, so the packet creator 14 creates the initialization setting packet (FIG. 5) in which the header of a normal configuration write request packet has been transformed. Specifically, bits 7 and 6 of byte +2 in row 3 of the normal configuration write request packet are replaced by AE=10, and bits 0 to 3 of byte +2 in row 3 and bits 2 to 7 of byte +3 are replaced by AHB address. AHB address denotes the identification address of the device 20 connected to an AHB bus.

In step 108, the packet distributor 16 outputs the inputted packet to the corresponding PCIe-AHB address converters $18_1$ to $18_3$ on the basis of Bus No., Device No. and Function No. of the packet inputted from the packet creator 14.

In step 110, the output destination switch 30 of the PCIe-AHB address converter 18 to which the packet has been inputted from the packet distributor 16 searches for AE of the packet. In step 112, when AE=01, the flow proceeds to step 114.

Figure 10:
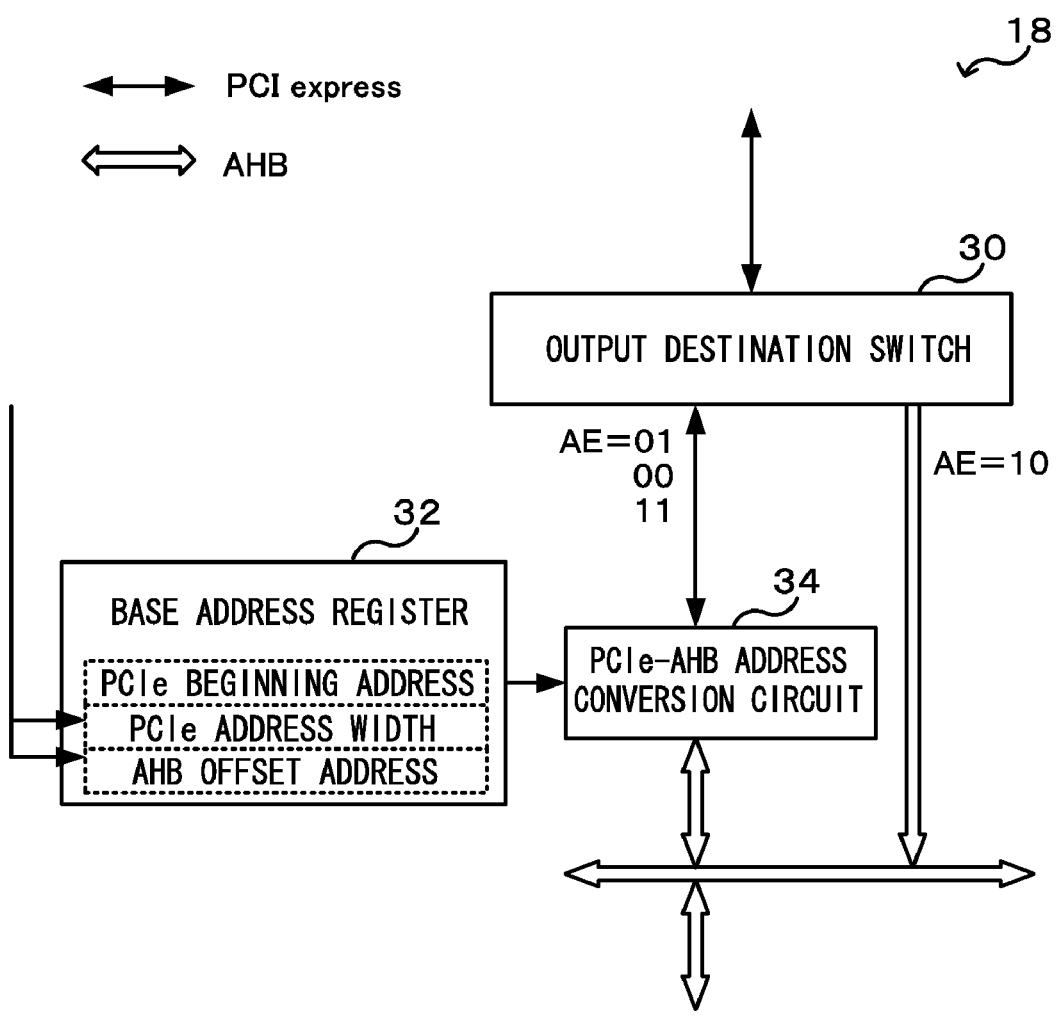
FIG. 10 is a general configuration diagram of one example of another configuration of the PCIe-AHB address converter pertaining to the first embodiment.

In the present embodiment, in step 114, the BAR used in address conversion in the PCIe-AHD address converter 18 is set such that it is changed from the BAR 32 to the BAR 33. In the present embodiment, as a method of setting the PCIe address width and the AHB offset address used in address conversion to unique values of the device 22, the BAR 33 in which those unique values have been stored is prepared beforehand in the configuration space, and setting to change the BAR used in address conversion from the BAR 32 to the BAR 33 is performed. The method is not limited to this method; for example, as shown in FIG. 10, the PCIe address width and the AHB offset address that are unique values may also be prepared in the configuration space, and setting may also be performed to rewrite to the BAR (the BAR 32) denoted by the packet. For example, the packet creator 14 may create the change setting packet including a PCIe address width and an AHB offset address that are unique values, and the PCIe-AHB address converter 18 may perform setting to rewrite the PCIe address width and the AHB offset address stored in the BAR 32 to a PCIe address width and an AHB offset address that are unique values.

Thus, appropriate address conversion can be performed using the PCIe address width and the AHB offset address that are unique values of the device 22.

After the BAR has been set in step 114, the flow returns to step 102.

On the other hand, when AE=10 in step 112, the flow proceeds to step 116, the AHB address is written in the internal memory of the device $20_1$ or the device $20_2$, and thereafter the flow returns to step 102.

In step 116, the unique identification address of the device $20_1$ or the device $20_2$ (itself) is written in the internal memory of the device $20_1$ or the device $20_2$. When AE=10 in step 112, the initialization setting packet is outputted from the output destination switch 30 to the device $20_1$ or the device $20_2$ without involving the PCIe-AHB address conversion circuit 34, and the AHB address that the packet denotes is written in the internal memory of the device $20_1$ or the device $20_2$ to which the packet has been inputted.

Thus, the device $20_1$ or the device $20_2$ can transmit and receive packets via an AHB bus because it becomes capable of being aware of its identification address.

After the AHB address has been written in the internal memory of the device $20_1$ or the device $20_2$ in step 116, the flow returns to step 102.

In step 118, which is a step after it has been determined that AE=00 or AE=11 in step 104, the packet creator 14 and packet distributor 16 are disconnected from each other, the packet distributor 16 and the PCIe bridge 12 are connected to each other, and the present processing is ended. Initial setting is completed by the processing of step 114 or step 116, so subsequent packets are outputted from the PCIe bridge 12 to the packet distributor 16.

In the present embodiment, when the device $20_1$ or the device $20_2$ is connected to an AHB bus, the initial setting information of FIG. 3 is stored in the ROM 24, the initial setting information is read in step 102, the packet creator 14 creates the initialization setting packet in step 106, the packet distributor 16 outputs the initialization setting packet to the corresponding PCIe-AHB address converter $18_1$ or PCI-e-AHB address converter $18_2$ in step 108, the output destination switch 30 outputs the initialization setting packet to the device $20_1$ or the device $20_2$, and AHB address is written in the internal memory of the device $20_1$ or the device $20_2$ in step 116.

When the device 22 is connected to an AHB bus, the initial setting information of FIG. 4 is stored in the ROM 24, the initial setting information is read in step 102, the packet creator 14 creates the change setting packet in step 106, the packet distributor 16 outputs the change setting packet to the corresponding PCIe-AHB address converter $18_3$ in step 108, and in step 114 the BAR 32 is set to the BAR 33 in which the unique PCIe address width and AHB offset address of the device 22 are stored.

In the present embodiment, when AE=01, the change setting packet is created, and when AE=10, the initialization setting packet is created, and when AE=00 or 11, the present processing is ended and packets are processed as normal packets, but the relationship between the values of AE and the processing content is not limited to this. It suffices for the relationship between these values and the processing content to be predetermined, and, for example, the case where AE=01 and the case where AE=10 may also be reversed.

When the input terminal to which the initial setting information is inputted from the ROM 24 to the information processing device 10 is pulled up in order to stabilize input, by ending the present processing when AE=11, the information processing device 10 (the packet creator 14) regards AE=11 as an end condition, so a mechanism to automatically end processing can be realized. In the same manner, when the input terminal is pulled down in order to stabilize input, by ending the present processing when AE=00, the information processing device 10 (the packet creator 14) regards AE=00 as an end condition, so a mechanism to automatically end processing can be realized.

In the initialization setting packet of the present embodiment, 10 bits are used to denote AHB address, but the number of bits that can be used is not limited to this. The number of bits that can be used can be increased by using the Tag designated portion or the R portion. In the same manner, in the change setting packet of the present embodiment, 6 bits are used to denote Register No., but the number of bits that can be used is not limited to this. The number of bits that can be used can be increased by using the Tag designated portion or the R portion.

In the present embodiment, a case where the non-PCIe bus is an AHB bus has been described, but the invention is not limited to this. Even with other non-PCIe buses, in the same manner the initialization setting packet can be created, an identification address can be set in a device, the change setting packet can be created, and a device-unique PCIe address width and AHB offset address can be set in a BAR.

The number of the PCIe-AHB address converters 18 and the numbers of the devices $20_1$ and $20_2$ and the device 22 are not limited to those in the present embodiment as long as they are within the scope of the PCIe standard.

In the present embodiment, there has been described in detail the information processing device 10 that performs initial setting when it uses, as devices connected to a PCIe bus, the devices $20_1$ and $20_2$ having unique identification addresses connected to a non-PCIe bus and the device 22 having a unique PCIe address width and AHB offset address, but the information processing device is not limited to this and may also be an information processing device that performs initial setting when it uses, as a device connected to a PCIe bus, only devices of either type.

Figure 11:
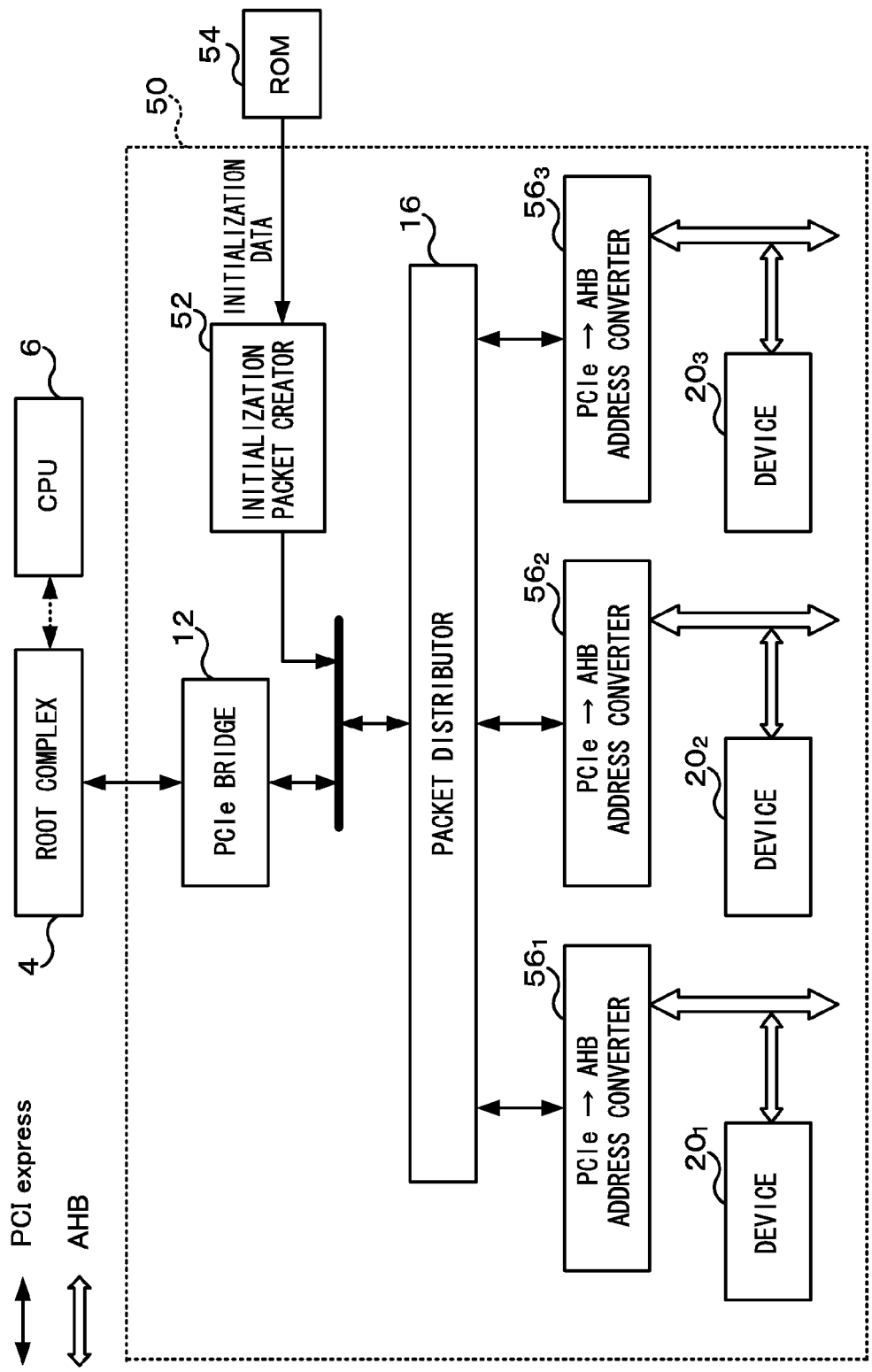
FIG. 11 is a general configuration diagram of one example of an information processing device pertaining to a second embodiment.
Figure 12:
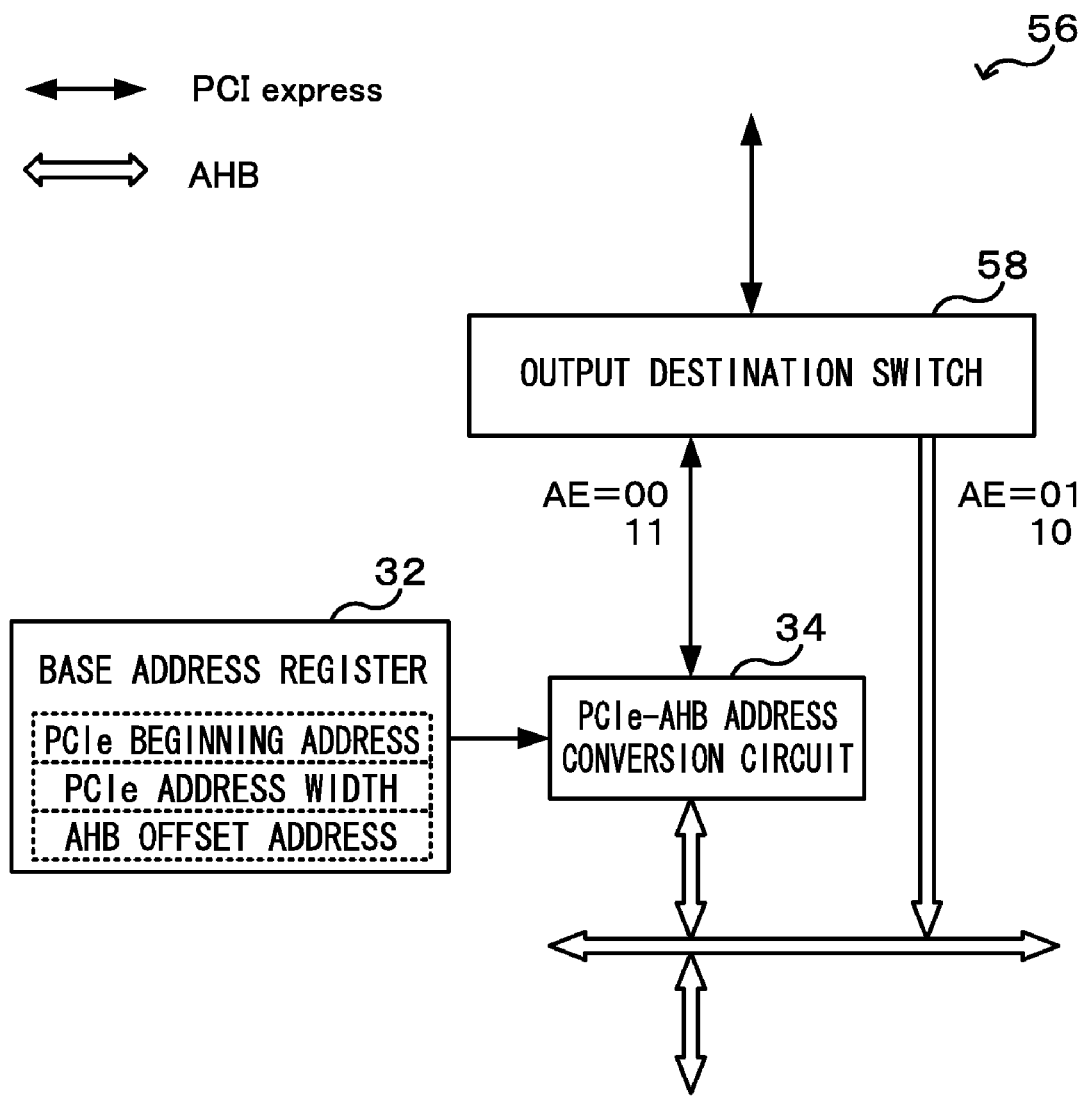
FIG. 12 is a general configuration diagram of one example of a PCIe-AHB address converter pertaining to the second embodiment.

For example, like in a second embodiment shown in FIG. 11, the information processing device may also be configured like an information processing device 50 that performs initial setting when it uses, as devices connected to a PCIe bus, devices having unique identification addresses connected to a non-PCIe bus. In this case, devices $20_1$ to $20_3$ are all devices having unique identification addresses. In a ROM 54, for example, only initial setting information that generates the initialization setting packet when AE=01 or 10 is stored beforehand. An initialization setting packet creator 52 corresponding to the packet creator 14 creates and outputs only the initialization setting packet. PCIe-AHB address converters $56_1$ to $56_3$ have the general configuration shown in FIG. 12.

Figure 13:
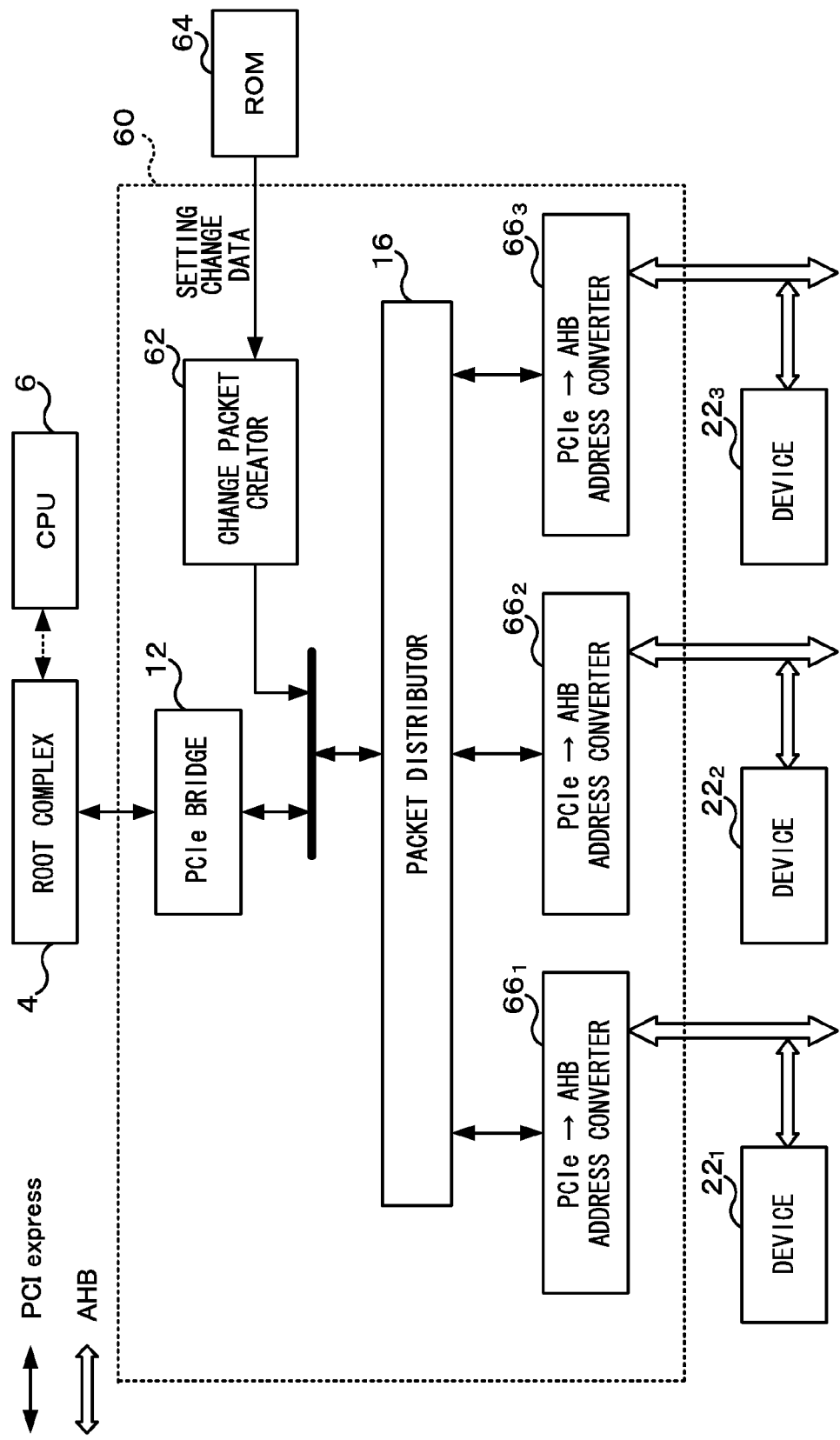
FIG. 13 is a general configuration diagram of one example of an information processing device pertaining to a third embodiment.
Figure 14:
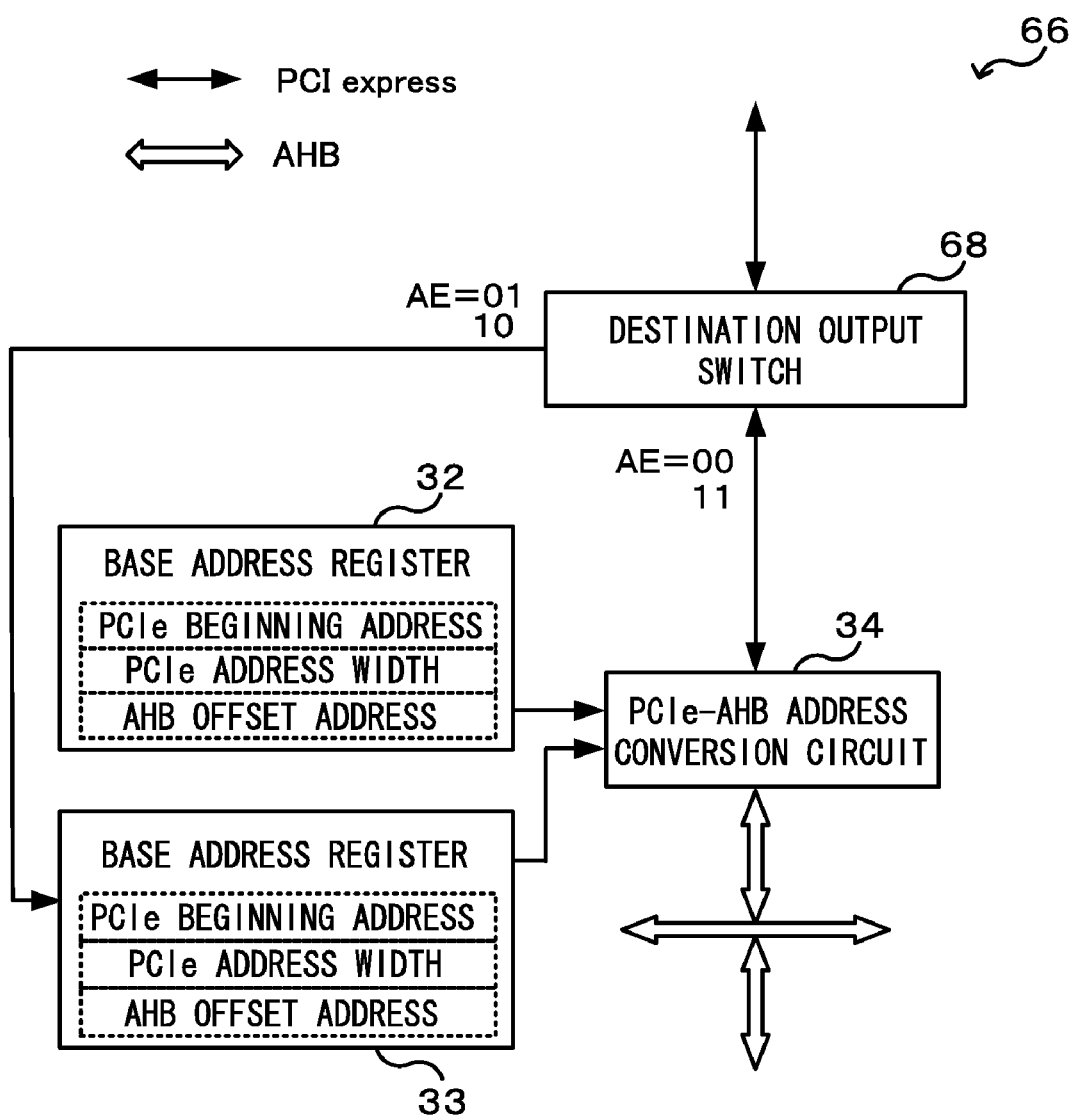
FIG. 14 is a general configuration diagram of one example of a PCIe-AHB address converter pertaining to the third embodiment.
Figure 15:
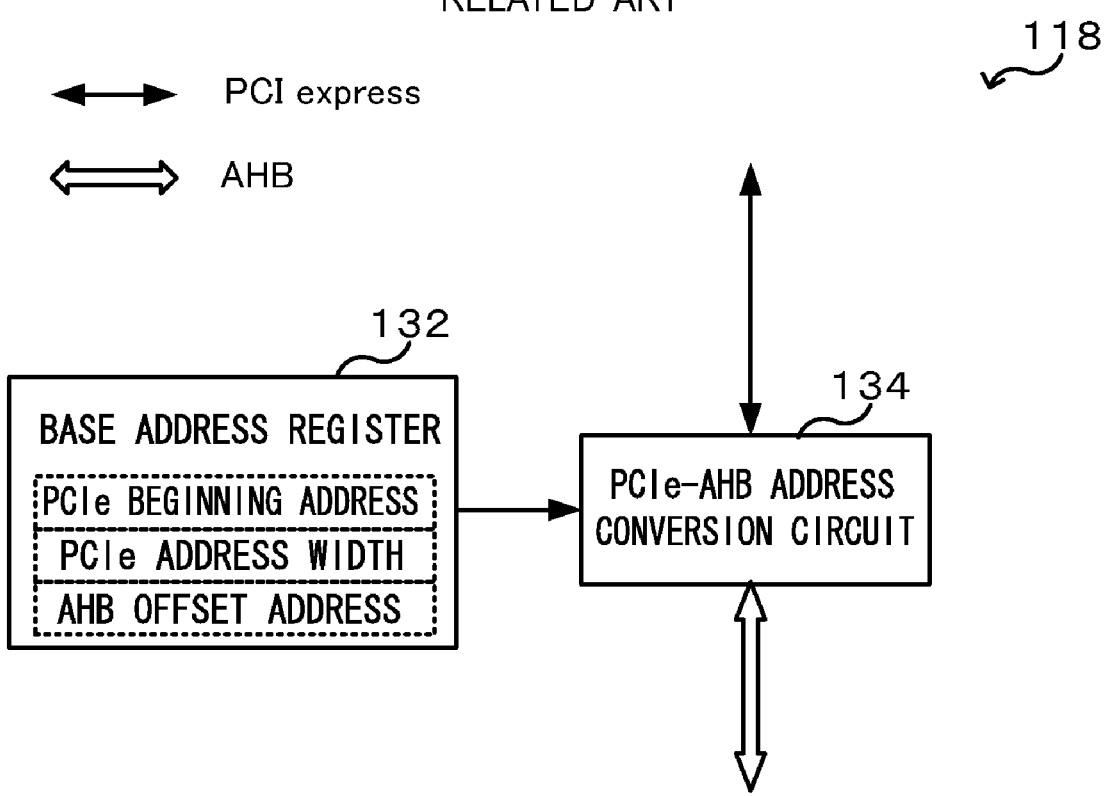
FIG. 15 is a general configuration diagram of one example of a configuration of a conventional PCIe-AHB address converter.

For example, like in a third embodiment shown in FIG. 13, the information processing device may also be configured like an information processing device 60 that performs initial setting when it uses, as devices connected to a PCIe bus, device having unique PCIe address widths and AHB offset addresses connected to a non-PCIe bus. In this case, devices $22_1$ to $22_3$ are all devices having unique PCIe address widths and AHB offset addresses. In a ROM 64, for example, only initial setting information that generates the change setting packet when AE=01 or 10 is stored beforehand. An initial change setting packet creator 62 corresponding to the packet creator 14 creates and outputs only the change setting packet. PCIe-AHB address converters $66_1$ to $66_3$ have the general configuration shown in FIG. 16.

As described above, in the information processing device 10 of the present embodiment, the packet creator 14 reads the initial setting information stored beforehand in the ROM 24 at the time of initial setting after the CPU 6 has reset the devices. When the AE value of the initial setting information that the packet creator 14 has read shows it is initial setting information for creating the initialization setting packet, the packet creator 14 creates the initialization setting packet, and when the AE value shows it is initial setting information for creating the change setting packet, the packet creator 14 creates the change setting packet and outputs the created packet to the packet distributor 16. The packet distributor 16 outputs the inputted initialization setting packet or change setting packet to the corresponding PCIe-AHB address converters $18_1$ to $18_3$. In the PCIe-AHB address converters $18_1$ and $18_2$, when the initialization setting packet is inputted, the inputted initialization setting packet is outputted by the output destination switch 30 to the devices (the devices $20_1$ and $20_2$) of the AHB address that the packet represents, and in each of the devices $20_1$ and $20_2$, a unique identification address is written in the internal memory.

Thus, the devices $20_1$ and $20_2$ can transmit and receive data. Consequently, the devices $20_1$ and $20_2$ having unique identification addresses connected to an AHB bus can be used as devices connected to a PCIe bus.

In the PCIe-AHB address converter $18_3$, when the change setting packet is inputted, the BAR is set such that it is changed from the BAR 32 to the BAR 33 in order to set the PCIe address width and AHB offset address used in address conversion to unique values of the device $20_3$.

Thus, address conversion of the device $20_3$ can be performed appropriately in the PCIe-AHB address conversion circuit 34. Consequently, the device $20_3$ having a unique identification address connected to an AHB bus can be used as a device connected to a PCIe bus.

In the information processing device 10 of the present embodiment, as mentioned above, the packet creator 14 creates either of the initialization setting packet and the change setting packet of the same form as a configuration write request packet in which a configuration write request packet has been transformed, whereby it can respond to the devices $20_1$ and $20_2$ and the device $20_3$. That is, initial setting of different types of devices can be performed with common hardware, so in comparison to when hardware components (circuits) that perform initial setting are separately disposed, the circuit scale of a PCIe-connected peripheral circuit can be made small and the circuit can be created at a low cost.

In this manner, in the present embodiment, the R portion of a normal configuration write request packet is transformed to create the initialization setting packet and the change setting packet, and specifically the format portion and the type portion of the initialization setting packet and the change setting packet are the same as in a normal configuration write request packet, so in the packet distributor 16, the packets can be processed in the same manner as a normal configuration write request packet. The packet distributor 16 of the present embodiment judges that the packet is a normal configuration write request packet when R=0 and judges that the packet is not a normal packet when 1 is denoted in the AE portion.

Only the R portion of a normal configuration write request packet is transformed, so setting operation to a configuration space resulting from a normal configuration write request packet is not affected.

Usually, in PCIe, the address map of a device is not determined unless the configuration register is set. That is, in initial setting, packets other than configuration write request packets are in a state where they cannot be used. In the present embodiment, a configuration write request packet is used to perform initial setting, so even in an initial state where the address maps of devices are not determined, unique identification addresses can be set in the devices and device-unique PCIe address widths and AHB offset addresses can be set in the PCIe-AHB address converters. Thus, initialization of plural devices can be realized by a common mechanism, so in comparison to when devices that realize initialization (initialization circuits) are disposed for each device, the number of input/output terminals of the information processing device can be reduced and the scale of the device (chip) can be made small.

According to a first aspect of the present invention, there is provided an information processing device including: an address converter including a base address register in which is stored address conversion information including information relating to an address width of a bus that transmits and receives data and an internal memory address of a device, and a conversion circuit that converts, on the basis of the address conversion information stored in the base address register, a PCI Express standard bus address of an inputted packet into a non-PCI Express standard bus address; and a packet generator, wherein when first configuration information, which is based on the PCI Express standard and which includes a device-unique unique address of a first device that is connected to a non-PCI Express standard bus and that has the unique address and that is unaware of the unique address, is stored previously in a storage, the packet generator generates, on the basis of the first configuration information stored in the storage, an address setting configuration write request packet including the unique address that causes the first device to become aware of the unique address, and outputs the address setting configuration write request packet to the address converter, and when second configuration information which is based on the PCI Express standard and which includes change information for changing the base address register to a base address register in which is stored a device-unique unique value of a second device that is connected to a non-PCI Express standard bus, the unique value being at least one of an address width or an internal memory address, is stored previously in the storage, the packet generator generates, on the basis of the second configuration information stored in the storage, a change setting configuration write request packet including the change information, and outputs the change setting configuration write request packet to the address converter.

According to a second aspect of the present invention, in the first aspect, format portions and type portions of headers of the address setting configuration write request packet and the change setting configuration write request packet may have the same form as a PCI Express standard configuration write request packet.

According to a third aspect of the present invention, in the first or second aspect, the first configuration information may include generated packet class information indicating that it is the first configuration information, and the second configuration information includes generated packet class information indicating that it is the second configuration information, and when the generated packet class information indicates the first configuration information, the packet generator may generate the address setting configuration write request packet including the generated packet class information, and when the generated packet class information indicates the second configuration information, the packet generator may generate the change setting configuration write request packet including the generated packet class information According to a fourth aspect of the present invention, in the third aspect, when the address converter judges on the basis of the generated packet class information that the inputted packet is the address setting configuration write request packet, the address converter may output the inputted address setting configuration write request packet to the first device without performing address conversion by the conversion circuit.

According to a fifth aspect of the present invention, in the third or fourth aspect, when the address converter judges on the basis of the generated packet class information that the inputted packet is the change setting configuration write request packet, the address converter may change the base address register to the base address register in which the unique value of the second device is stored.

According to a sixth aspect of the present invention, in any of the first to fifth aspects, the address converter may further include a first address converter that converts and outputs to the first device the address of the inputted packet and a second address converter that converts and outputs to the second device the address of the inputted packet, and the packet generator may output the generated address setting configuration write request packet to the first address converter and may output the generated change setting configuration write request packet to the second address converter.

According to the aspects of the present invention, setting corresponding to a device for using a device connected to a non-PCIe standard bus as a device connected to a PCIe bus can be performed.

Embodiments of the present invention are described above, but the present invention is not limited to the embodiments as will be clear to those skilled in the art.

What is claimed is:

1. An information processing device comprising:
an address converter comprising
a base address register in which is stored an address conversion information including information relating to an address width of a bus that transmits and receives data and an internal memory address of a device, and
a conversion circuit that converts, on the basis of the address conversion information stored in the base address register, a Peripheral Component Interconnect (PCI) Express standard bus address of an inputted packet into a non-PCI Express standard bus address; and
a packet generator, wherein
when a first configuration information, which is based on the PCI Express standard and which includes a device-unique unique address of a first device that is connected to a non-PCI Express standard bus and that has the unique address and that is unaware of the unique address, is stored previously in a storage, the packet generator generates, on the basis of the first configuration information stored in the storage, an address setting configuration write request packet including the unique address that causes the first device to become aware of the unique address, and outputs the address setting configuration write request packet to the address converter, and
when a second configuration information which is based on the PCI Express standard and which includes a change information for changing the base address register to a base address register in which is stored a device-unique unique value of a second device that is connected to a non-PCI Express standard bus, the unique value being at least one of an address width or an internal memory address, is stored previously in the storage, the packet generator generates, on the basis of the second configuration information stored in the storage, a change setting configuration write request packet including the change information, and outputs the change setting configuration write request packet to the address converter.

2. The information processing device according to claim 1, wherein format portions and type portions of headers of the address setting configuration write request packet and the change setting configuration write request packet have the same form as a PCI Express standard configuration write request packet.

3. The information processing device according to claim 1, wherein
the first configuration information includes generated packet class information indicating that it is the first configuration information, and the second configuration information includes generated packet class information indicating that it is the second configuration information, and
when the generated packet class information indicates the first configuration information, the packet generator generates the address setting configuration write request packet including the generated packet class information, and when the generated packet class information indicates the second configuration information, the packet generator generates the change setting configuration write request packet including the generated packet class information.

4. The information processing device according to claim 3, wherein when the address converter judges on the basis of the generated packet class information that the inputted packet is the address setting configuration write request packet, the address converter outputs the inputted address setting configuration write request packet to the first device without performing address conversion by the conversion circuit.

5. The information processing device according to claim 3, wherein when the address converter judges on the basis of the generated packet class information that the inputted packet is the change setting configuration write request packet, the address converter changes the base address register to the base address register in which the unique value of the second device is stored.

6. The information processing device according to claim 1, wherein
the address converter further comprises a first address converter that converts and outputs to the first device the address of the inputted packet and a second address converter that converts and outputs to the second device the address of the inputted packet, and
the packet generator outputs the generated address setting configuration write request packet to the first address converter and outputs the generated change setting configuration write request packet to the second address converter.

* * * * *